United States Patent [19]

Thomas

[11] 4,403,507

[45] Sep. 13, 1983

[54] WHEEL BALANCE INDICATOR

[76] Inventor: Sam S. Thomas, 3601 Piedmont Rd., Apt. 707, Atlanta, Ga. 30305

[21] Appl. No.: 297,639

[22] Filed: Aug. 31, 1981

[51] Int. Cl.³ .............................................. G01M 1/28
[52] U.S. Cl. ......................................... 73/457; 73/460
[58] Field of Search ......................... 73/457, 459, 460; 157/14

[56] References Cited

U.S. PATENT DOCUMENTS

| | | | |
|---|---|---|---|
| 2,194,936 | 3/1940 | Hatch | 157/18 X |
| 2,553,058 | 5/1951 | Martin | 73/459 |
| 2,656,713 | 10/1953 | Allen | 73/457 |
| 3,289,483 | 12/1966 | Slemmons | 73/459 |
| 3,585,962 | 6/1971 | Vartia | 73/457 X |
| 3,815,425 | 6/1974 | Skidmore | 73/457 |
| 3,965,752 | 6/1976 | Davis | 73/457 |
| 4,094,198 | 6/1978 | Moulinoox | 73/460 |

Primary Examiner—James J. Gill
Assistant Examiner—John E. Chapman, Jr.
Attorney, Agent, or Firm—George M. Thomas

[57] ABSTRACT

A chuck is mounted to the hub of an out-of-balance wheel and an indicator stem is connected by means of a ball joint to the chuck. When the wheel is rotated and reaches a velocity such that it tends to oscillate, the indicator stem is moved to an attitude where it extends across the axis of oscillation and is balanced in this position. The rotation of the wheel is then stopped and the position of the indicator stem indicates the location where a weight is needed on the wheel and the approximate amount of weight needed at this position.

6 Claims, 4 Drawing Figures

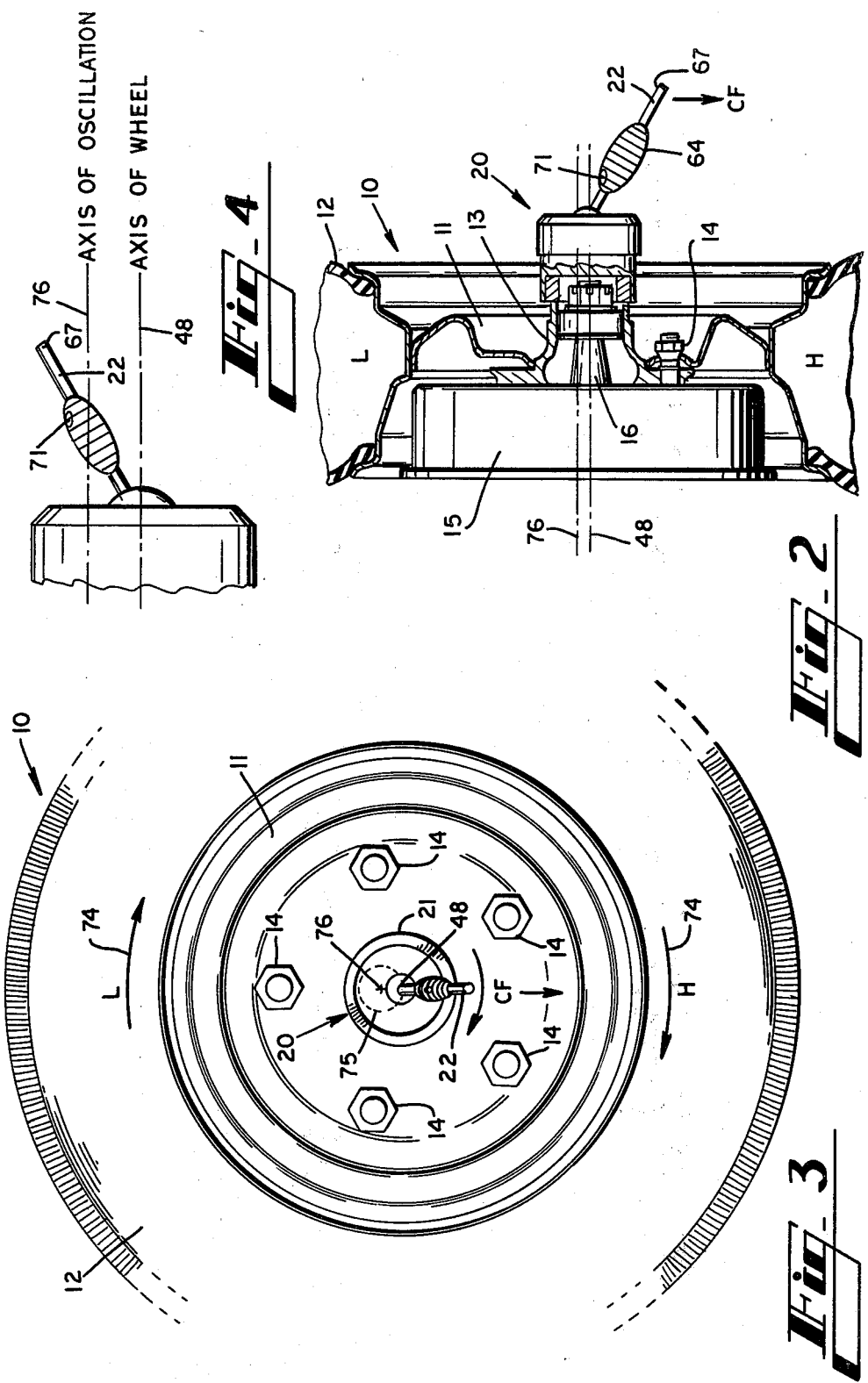

WHEEL BALANCE INDICATOR

BACKGROUND OF THE INVENTION

This invention relates in general to a method and apparatus for balancing automobile wheels while the wheel is still mounted on the automobile, and particularly to a wheel balance indicator that is attached to the hub of the wheel and rotates with the wheel and provides an indication of an out-of-balance condition of the wheel in response to the wheel's rotation.

When automobile wheels are to be checked for out-of-balance conditions, it is highly desirable to make the calibration while the wheel is on the vehicle so that if the brake drum, spindle or other components of the wheel assembly have caused or contributed to an out-of-balanced condition, these conditions will be measured with the conditions of the rim, tire, lugs, etc. Moreover, it is desirable that the operator not be required to remove the wheel from the vehicle when balancing the wheel so as to avoid the time and effort required in removing and remounting the wheel.

Additionally, it is desirable for the wheel balance operator to be able to determine the out-of-balance condition of a wheel, then add a weight to the light portion of the wheel, and then make an immediate redetermination of the wheel to determine if additional weights are required.

SUMMARY OF THE INVENTION

Briefly described, the present invention comprises a wheel balance indicator which comprises a chuck connectable directly to the hub of an automobile wheel, and an indicator stem which is connected by a ball joint to the chuck, and which is pivotal with respect to the chuck and the wheel. When the wheel is rotated on its own axis, if the wheel is out-of-balance, the wheel tends to oscillate about an axis of oscillation which is offset from the axis of rotation of the wheel. The indicator stem can be pivoted manually so that it extends at its ball connection from the axis of rotation of the wheel across the axis of oscillation of the wheel, so that its distal end is balanced with respect to the proximal end. When this balanced condition is reached, the operator slows the rotation of the wheel until the wheel is stopped, and the distal end of the indicator stem will be inclined toward the portion of the wheel that requires a balance weight. Moreover, the angle at which the indicator stem makes with respect to the axis of rotation of the wheel will indicate the amount of weight required to properly balance the wheel.

Thus, it is an object of the present invention to provide a wheel balance indicator for automobile wheels and the like, which can be expediently mounted to the hub of the wheel and which can be manipulated during wheel rotation to provide an indication of the location and amount of weight required to balance the wheel.

Another object of this invention is to provide a wheel balance indicator that includes a gauge that indicates the location on the wheel where a weight should be applied and indicate the approximate amount of weight which should be applied at such location in response to the rotation of the wheel.

Other objects, features and advantages of the present invention will become apparent upon reading the following specification, when taken in conjunction with accompanying drawings.

BRIEF DESCRIPTION OF THE DRAWINGS

FIG. 2 is a side elevational view of a portion of a wheel assembly with the wheel balance indicator mounted thereon, and with the indicator stem out-of-balance.

FIG. 3 is a side elevational view of a portion of a wheel assembly with the wheel balance indicator mounted thereon, showing the indicator stem out-of-balance.

FIG. 4 is a detail illustration of the wheel balance indicator, showing the indicator stem in a balanced condition.

DETAILED DESCRIPTION

Figure 1:
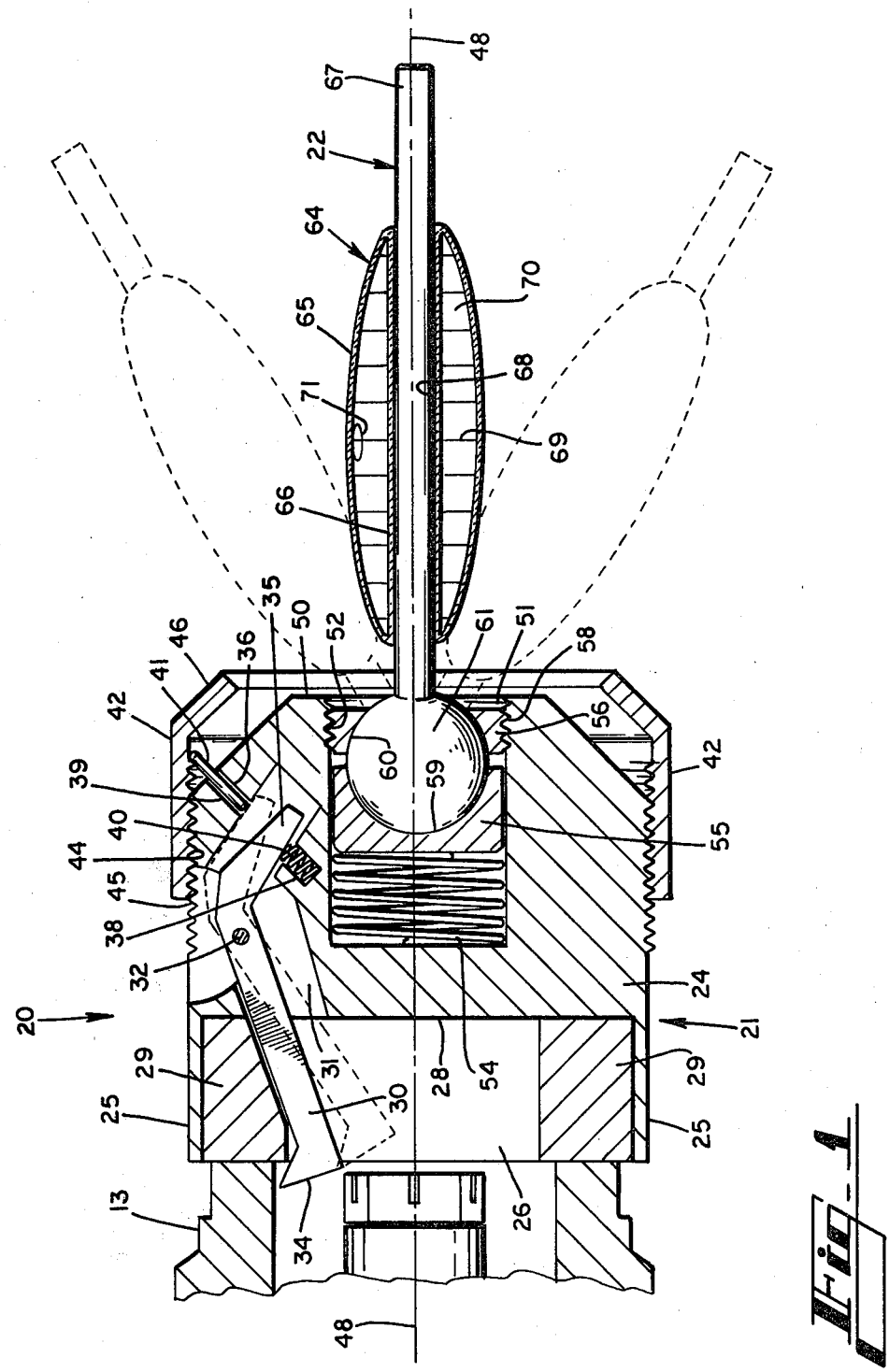
FIG. 1 is a side cross-sectional view of the wheel balance indicator and a portion of the hub section of an automobile wheel assembly.

Referring now in more detail to the drawings, in which like numerals indicate like parts throughout the several views, FIGS. 2 and 3 illustrate a wheel assembly 10 that includes a rim 11 with a rubber tire 12 mounted thereabout, and a hub 13 to which the rim is mounted. The rim is fastened to the hub structure by a plurality of wheel hub bolts 14, and a brake drum 15 is rigidly fastened to the hub structure so as to rotate therewith. The hub 13 is rotatably mounted to spindle 16. This is conventional in the art.

Wheel balance indicator 20 is arranged to be mounted to hub 13 and includes chuck 21 and indicator stem 22. Chuck 21 comprises chuck housing 24 that includes a skirt 25 defining a central recess 26 formed within skirt 25 adjacent inner wall surface 28. A plurality of magnets 29 are secured to the inner wall surface 28 at skirt 25. A plurality of connector fingers 30 (only one shown in FIG. 1) are pivotally mounted to chuck housing 24 within slots 31, with each connector finger being pivotally mounted in the chuck housing 24 by means of a pivot pin 32 passing through the connector finger at a location intermediate its ends and into the chuck housing. Each connector finger 30 extends from pivot pin 32 in one direction toward the opening of skirt 25 and includes a protruding end portion 34 that projects outwardly from the confines of the skirt. The other end portion 35 of each connector finger 30 is an actuating end portion. A bore 36 extends from the outer surface of chuck housing 24 inwardly through each connector finger slot 31, to form an inner bore 38 inwardly of the connector finger slot and an outer bore 39 that opens outwardly from the connector finger slot through the chuck housing. Coil compression springs 40 are mounted in each inner bore 38, while actuating pins 41 are reciprocatably positioned in each outer bore 39.

Rotatable collar 42 extends about the outer surface of chuck housing 24 and includes internal helical threads 44 which engage the external helical threads 45 on the outer surface of chuck housing 24. The protruding edge portion of rotatable collar 42 includes an annular inwardly sloped flange 46 which covers actuating pins 41. The actuating pins 41 are sized and shaped so that they are held with their inner end portions protruding into the outer bores 39 of the outer bores 39 of the chuck housing when the rotatable collar is first threaded on the external surface of chuck housing 24, and as the collar 42 is further rotated and moved onto the surface of chuck housing 24, the annular sloped flange 46 engages the outer end portions of the actuating pins 41 so as to progressively move the pins further into the outer bores 39.

The coil compression springs 40 each engage the inner surface of the actuating end portion 35 of a connector finger 30 so as to bias the actuating end portion 35 toward engagement with an actuating pin 41 and to bias the protruding end portion 34 radially inwardly with respect to chuck housing 24. As the rotatable collar 42 is threaded further onto the surface of chuck housing 24, the annular sloped flange 46 of the collar begins to progressively move the actuating pins 41 inwardly with respect to the chuck housing, so as to pivot the connector fingers simultaneously against the bias of their springs 40, thus simultaneously moving the protruding end portions 34 radially outwardly with respect to the chuck housing.

When the chuck 21 is placed in abutment with the hub 13 of a wheel assembly 10, the magnets 29 tend to affix the chuck to the hub. When the rotatable collar 42 of the chuck is rotated with respect to the chuck housing 24, the protruding end portions 34 of the connector fingers 30 move radially outwardly with respect to the chuck and protrude beyond the skirt 25 so as to engage the inner surface of the hub 13 of the wheel. This tends to center the chuck 21 with respect to the hub 13, so that the chuck 21 is centrally located with respect to the axis of rotation 48 of the wheel assembly, and the chuck is securely mounted to the hub 13.

The outer surface 50 of chuck housing 24 includes a bore or opening 51 that is located centrally with respect to the chuck housing 24 for alignment with the axis of rotation 48 of the wheel assembly. Helical threads 52 are formed in the bore 51 adjacent the outer surface 50. A coil compression spring 54 is seated in bore 51, a ball receptacle 55 is positioned against the coil compression spring, and a ball retainer 56 which includes external helical threads 58 is threaded into the threads 52 of bore 51. The ball receptacle and ball retainer 55 and 56 each include concave recesses 59 and 60.

Indicator stem 22 includes a ball 61 at one end which is received in the concave recesses 59 and 60 of the ball receptacle 55 and ball retainer 56. Thus, the ball receptacle 55, ball retainer 56 and ball 61 form a ball joint assembly which permits the indicator stem 22 to pivot freely at one end portion with respect to chuck 21. The coil compression spring 54 biases the ball receptacle 55 against ball 61 with enough force that the indicator stem 22 will retain a fixed attitude with respect to the chuck 21, but the indicator stem 22 can be pivoted manually or by centrifugal force with respect to the chuck 21. The force exerted by spring 54 can be increased or decreased by threading ball retainer 56 further into or further out of opening 51, thus applying greater force or less force against the ball 61, tending to adjust the holding force applied to indicator stem 22. Thus, the coil compression spring 54 functions to exert a force against the ball which releasably maintains the indicator stem in a fixed attitude with respect to the chuck.

Air bubble housing 64 surrounds the intermediate portion of indicator stem 22, between the ball 61 and the distal end portion 67 of the indicator stem 22. Air bubble housing 64 includes annular outer wall 65 joined at its ends to inner annular wall 66, so that an internal indicator stem opening 68 is formed by the inner annular wall 66. Thus, the air bubble housing 64 can be fitted about the distal end portion 67 of the indicator stem and slid up toward ball 61. Measuring indicia 69 is formed on outer annular wall 65 of the air bubble housing, and the annular internal cavity 70 is partially filled with liquid so as to form an indicator bubble 71 within the cavity 70. Thus, air bubble 71 will always indicate the attitude of indicator stem 22, and the indicia 69 will provide a means for measuring the angle at which the indicator stem 22 varies from the horizontal.

When the wheel balance indicator 20 is mounted to the hub 13 of a wheel assembly 10, and when the wheel assembly is rotated as indicated by the arrows 74 of FIG. 3, the wheel balance indicator 20 will rotate in unison with the wheel. The wheel rotates on its own axis of rotation 48, and the chuck 21 is centered at the axis of rotation. Thus, the ball 61 of the indicator stem 22 is located at the axis of rotation 48, and if the distal end portion 67 of the indicator stem 22 is aligned with the axis of rotation 48, the indicator stem will continue to rotate in a horizontal attitude. On the other hand, if the indicator stem 22 is not aligned with the axis of rotation 48, it will tend to move under centrifugal force to a tilted attitude.

If the wheel assembly 10 is out-of-balance, with a heavy portion indicated at H and a lighter portion indicated at L of FIG. 3, the wheel assembly is likely to begin to oscillate as it is rotated, so that its axis of rotation 48 will oscillate in a circular path as indicated by the dash lines 75 of FIG. 3, which extend about the axis of oscillation 76. This tends to cause indicator stem 22 to assume an extreme tilted attitude (FIG. 2).

When the wheel is rotating and is also oscillating, the operator loosely grasps the intermediate portion of the indicator stem 22 with his hand and moves the intermediate portion of the indicator stem toward the axis of oscillation 76. This causes the distal end portion 67 to move across the axis of oscillation (FIG. 4), so that the pivotal end portion at the ball 61 of the indicator stem moves in the path of oscillation 75 while the distal end portion 67 also oscillates on the other side of the axis of oscillation 76, while the intermediate portion of the indicator stem is located in the axis of oscillation. Thus, the indicator stem tends to become balanced in this attitude.

Once the indicator stem 22 has become balanced, the operator slows the rotation of the wheel assembly 10 until the wheel is stationary, and the indicator stem will be inclined from its pivotal portion at the ball 61 so that its distal end portion 67 is directed toward the lighter portion of the wheel assembly. This gives an indication to the operator as to where to add a weight to the wheel assembly in order to balance the wheel assembly. The operator can also note the position of the air bubble 71 to provide an indication as to how much weight is required.

While this invention has been described in detail with particular reference to the preferred embodiment thereof, it will be understood that variations and modifications can be effected within the spirit and scope of the invention as described hereinbefore and as defined in the appended claims.

I claim:

1. A wheel balance indicator for attachment to a wheel assembly while rotatably mounted to a vehicle about a horizontal axis comprising a chuck for connection to the wheel assembly at the axis of rotation of the wheel assembly, an indicator stem having a pivotable ball end portion pivotably received in a socket means of the chuck and a free distal end portion angularly movable with respect to said chuck, means for biasing said pivotable ball end portion in engagement with said socket means to yieldably hold the indicator stem in a fixed attitude with respect to said chuck, whereby when the wheel balance indicator is mounted on a wheel assembly that is out of balance and the wheel assembly is rotated on the vehicle about its axis of rotation so that the wheel assembly oscillates about an axis of oscillation, the indictor stem can be oriented as the wheel assembly rotates so that it extends from its pivotable end portion at the axis of rotation and intersects the axis of oscillation such that the indictor stem becomes balanced in this attitude and remains in this attitude when the rotation and oscillation of the wheel assembly is stopped.

2. The wheel balance indicator of claim 1 and wherein said chuck comprises a hub for abutment with the hub of a wheel assembly, a plurality of connector fingers each pivotably connected to said hub and having an end portion arranged to swing radially outwardly of said hub for engagement with the inner surface of a wheel hub, spring means in engagement with said connector fingers for biasing the end portion of each connector finger radially inwardly of said hub, and actuator means for urging the end portion of each connector finger radially outwardly of said hub.

3. The wheel balance indicator of claim 1 wherein said chuck comprises a hub for abutment with the hub of a wheel assembly, said hub of said chuck including a magnet for mounting said hub to the hub of the wheel assembly.

4. The wheel balance indicator of claim 1 and wherein said indicator stem includes an air bubble indicator for indicating its attitude.

5. The wheel balance indicator of claim 1 and wherein said indicator stem includes an air bubble housing that surrounds said indicator stem intermediate the end portions of said indicator stem, indicia on said air bubble housing and liquid partially filling said air bubble housing.

6. A method of indicating the out of balance condition of a wheel comprising attaching a pivotable indicator stem to a wheel rotatably mounted on a vehicle in a substantially vertical plane about a horizontal axis of rotation with the pivotable end portion of the stem at the axis of rotation of the wheel rotating the wheel until it reaches a velocity of rotation that causes its out of balance condition to cause the wheel to oscillate about an axis of oscillation orienting the distal end of the indicator stem so that the indicator stem intersects the axis of oscillation at an angle at which the stem is balanced; and stopping the rotation of the wheel while maintaining the indicator stem in the attitude in which it intersected the axis of oscillation.

* * * * *